(12) United States Patent
Arlazarov et al.

(10) Patent No.: US 10,354,142 B2
(45) Date of Patent: Jul. 16, 2019

(54) METHOD FOR HOLOGRAPHIC ELEMENTS DETECTION IN VIDEO STREAM

(71) Applicant: Smart Engines Service LLC, Moscow (RU)

(72) Inventors: Vladimir Viktorovich Arlazarov, Moscow (RU); Timofey Sergeevich Chernov, Dzerzhinsky (RU); Dmitry Petrovich Nikolaev, Moscow (RU); Natalya Sergeevna Skoryukina, Domodedovo (RU); Oleg Anatolyevitch Slavin, Moscow (RU)

(73) Assignee: SMART ENGINES SERVICE LLC, Moscow (RU)

( * ) Notice: Subject to any disclaimer, the term of this patent is extended or adjusted under 35 U.S.C. 154(b) by 152 days.

(21) Appl. No.: 15/668,455

(22) Filed: Aug. 3, 2017

(65) Prior Publication Data

US 2018/0247125 A1    Aug. 30, 2018

(30) Foreign Application Priority Data

Feb. 27, 2017    (RU) .................................. 2017106048

(51) Int. Cl.
*G06K 9/00* (2006.01)
*G06K 9/46* (2006.01)
(Continued)

(52) U.S. Cl.
CPC ...... *G06K 9/00711* (2013.01); *G06K 9/00442* (2013.01); *G06K 9/2054* (2013.01);
(Continued)

(58) Field of Classification Search
CPC ..................................... G06K 9/00; G06F 3/00
(Continued)

(56) References Cited

U.S. PATENT DOCUMENTS 9,442,459 B2 *   9/2016   Dluhos ................ G03H 1/0005

FOREIGN PATENT DOCUMENTS

CN    101915617 B    8/2012
CN    103196560 A    7/2013
(Continued)

OTHER PUBLICATIONS

Hartl, A., et al., AR-Based Hologram Detection on Security Documents Using a Mobile Phone, Springer International Publishing, 2014, pp. 335-346.
(Continued)

*Primary Examiner* — Abolfazl Tabatabai
(74) *Attorney, Agent, or Firm* — Procopio; Mark W. Catanese; Noel C. Gillespie (57) ABSTRACT

A method for detecting holographic elements in a video stream containing images in the form of documents includes: processing of a video stream in which the document image is stabilized; constructing saturation and color tone maps; analyzing color characteristics in image regions; constructing histograms of color characteristics; estimating a change in the color characteristics at least in part based on data obtained by calculating a difference between the histograms of a current and a previous frame; constructing an integrated map of hologram presence estimates by combining calculated estimates for all video stream frames based at least in part on the estimation of the change in color characteristics; and determining final regions of the holographic elements based at least in part on the integrated map of the hologram presence estimates.

15 Claims, 4 Drawing Sheets

(51) Int. Cl.
*G06K 9/20* (2006.01)
*G06F 3/00* (2006.01)

(52) U.S. Cl.
CPC ......... *G06K 9/4642* (2013.01); *G06K 9/4652* (2013.01); *G06K 2009/00738* (2013.01)

(58) Field of Classification Search
USPC ........................................................ 382/103
See application file for complete search history.

(56) References Cited

FOREIGN PATENT DOCUMENTS

| | | |
|---|---|---|
| DE | 29819954 U1 | 4/1999 |
| DE | 202005018964 U1 | 4/2006 |
| DE | 102013101587 A1 | 8/2014 |
| DE | 102013110785 A1 | 4/2015 |
| DE | 102014108492 A1 | 12/2015 |
| RU | 2185662 C2 | 7/2002 |
| WO | 1992001975 A1 | 2/1992 |
| WO | 20010154077 A1 | 7/2001 |
| WO | 2014125022 A1 | 8/2014 |

OTHER PUBLICATIONS

Soukup, D., et al., Analysis of optically variable devices using a photometric light-field approach. In Media Watermarking, Security, and Forensics 2015, Mar. 2015, vol. 9409, p. 94090R-1-94090R-9.
Hartl, A. D., et al., Efficient verification of holograms using mobile augmented reality, IEEE Transactions on Visualization and Computer Graphics, Jul. 2016, 22(7), pp. 1843-1851.
Hartl, A., et al., Mobile user interfaces for efficient verification of holograms. In VR, IEEE Computer Society, 2015, pp. 119-126.
Hartl, A., et al., Mobile interactive hologram verification. In ISMAR, IEEE Computer Society, 2013, pp. 75-82.
Hartl, A., et al., Towards mobile recognition and verification of holograms using orthogonal sampling, in International Workshop on Visual Recognition and Retrieval for Mixed and Augmented Reality (VRRMAR), 2015, pp. 6.
Stolc, S., et al., Invariant characterization of dovid security features using a photometric descriptor, IEEE, 2015, pp. 3422-3426.

* cited by examiner

METHOD FOR HOLOGRAPHIC ELEMENTS DETECTION IN VIDEO STREAM

CROSS-REFERENCE TO RELATED APPLICATION(S)

This application claims the benefit of priority of Russian Patent Application No. 2017106048, filed Feb. 27, 2017, the disclosure of which is incorporated herein in its entirety by reference.

BACKGROUND

1. Field

Aspects of the present disclosure relate generally to computer technology and more particularly to automatically detecting and recognizing holograms in a video stream consisting of a series of images in the red-green-blue (RGB) color space.

2. Related Art

Unless otherwise indicated herein, the materials described in this section are not prior art to the claims in this application and are not admitted to be prior art by inclusion in this section.

Methods for image search and recognition (see, for example, Russian Patent No. RU 2266565, published Dec. 20, 2005) suffer from a number of significant drawbacks, one of which is a potential lack of robustness in the presence of glare.

SUMMARY

Aspects of the present disclosure provide a reliable and accurate system and method for detection and localization of holograms present on documents which are extracted during video stream recognition.

According to various aspects there is provided a method for detecting holographic elements in a video stream containing images in the form of documents. In some aspects, the method may include: processing of a video stream in which at least one document image is stabilized; constructing saturation and color tone maps; analyzing color characteristics in at least one document image region; constructing histograms of color characteristics; estimating a change in the color characteristics at least in part based on data obtained by calculating a difference between the histograms of a current and a previous frame; constructing an integrated map of hologram presence estimates by combining calculated estimates for all video stream frames based at least in part on the estimation of the change in color characteristics; and determining final regions of the holographic elements based at least in part on the integrated map of the hologram presence estimates.

According to various aspects there is provided a non-transitory computer readable medium. In some aspects, the non-transitory computer readable medium may include instructions for causing one or more processors to perform operations including: processing of a video stream in which at least one document image is stabilized; constructing saturation and color tone maps; analyzing color characteristics in at least one document image region; constructing histograms of color characteristics; estimating a change in the color characteristics at least in part based on data obtained by calculating a difference between the histograms of a current and a previous frame; constructing an integrated map of hologram presence estimates by combining calculated estimates for all video stream frames based at least in part on the estimation of the change in color characteristics; and determining final regions of the holographic elements based at least in part on the integrated map of the hologram presence estimates.

According to various aspects there is provided a system for detection and localization of holographic elements in a video stream containing document images. In some aspects, the system may include: an I/O interface configured to receive a video stream; and a processor.

The processor configured to: process the video stream in which at least one document image is stabilized; construct saturation and color tone maps; analyze color characteristics in at least one document image region; construct histograms of the color characteristics; estimate a change in the color characteristics at least in part based on data obtained by calculating a difference between the histograms of a current and a previous frame; construct an integrated map of hologram presence estimates by combining calculated estimates for all frames of the video stream based at least in part on the estimation of the change in color characteristics; and determine final regions of the holographic elements based at least in part on the integrated map of the hologram presence estimates.

Other features and advantages should be apparent from the following description which illustrates by way of example aspects of the various teachings of the disclosure.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Aspects of the present disclosure provide a reliable and accurate method for detection and localization of holograms present on documents which are extracted during video stream recognition. Increased accuracy of detecting holographic elements contained in a document which is an image in a video stream may be achieved through robustness to noise and by minimizing errors in finding document boundaries.

The method for detecting holograms in a video stream containing images in the form of documents processes a video stream by stabilizing the document image and constructing color saturation and hue maps. Color characteristics analysis is performed in document image regions, and histograms of the color characteristics are constructed by taking into account the obtained data, an estimation of the change in the color characteristics is made by calculating the difference between the histograms in the current and previous frames, an integral map of the hologram presence estimates is built by combining the calculated estimates for all video stream frames by taking into account the estimation of the change in the color characteristics, and a search of final regions of the holographic elements is performed while taking into account the hologram presence estimation map.

In one aspect of the present disclosure, the document is stabilized by bringing each frame of the video stream to a single document coordinate system for which the document boundaries are determined, after which the projective correction of the document image is performed to a fixed size with the aspect ratio corresponding to the document.

In another aspect of the present disclosure, the construction of histograms of color characteristics in document image areas is performed by analyzing the window around the pixel position. The coordinates of the document image region and document image area are taken into account in the analysis.

In another aspect of the present disclosure, the difference between histograms on the current and previous frame is calculated to estimate the change in color characteristics.

In another aspect of the present disclosure, estimates computed for individual frames are combined for all frames of the video stream to obtain an integrated map of hologram presence estimates.

In another aspect of the present disclosure, in order to find the final regions of the holographic elements, gamma correction of the integral estimation map is made to amplify the maxima regions, then it is binarized to obtain a binary map of the presence of holograms, while the determination of the immediate region of the holographic element is performed by finding the connected components on a binary map and for the found connected component with the largest area a bounding rectangle is constructed.

Figure 1:
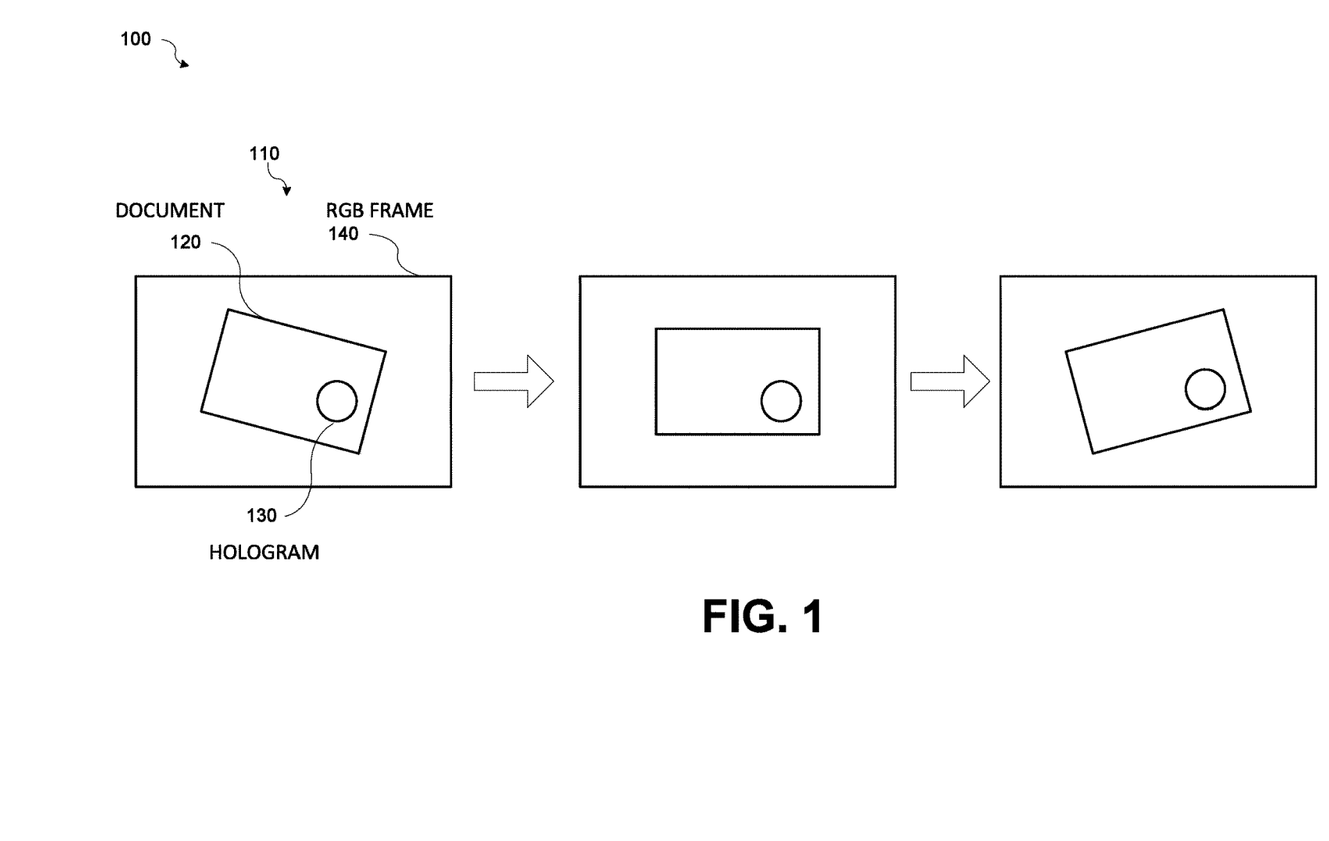
FIG. 1 is an illustration of a video stream.

A method is considered for hologram detection in video stream V, consisting of K document images $I_1, \ldots, I_K$ in the RGB color space. FIG. 1 is a diagram illustrating a video stream 100. Referring to FIG. 1, each video stream image 110 may contain a document image 120 in an RGB color space 140. Each document image 120, in turn can contain one or more holographic elements 130 with a fixed position on the document image 120. The document image 120 may be randomly aligned within the RGB color space 140.

The method, may use windows instead of single pixels, and may be resistant to noise and errors of finding document boundaries.

The holographic element search method analyzes the variability of color characteristics of document image areas in the video stream. The method may provide robustness to light reflections (i.e., glare), leading to scale-up or whitening of document image regions which may change color characteristics of document image areas. The video stream is processed, and then the region (areas) in which the strongest manifestation of holograms in the video stream was observed is processed.

Document Stabilization

Each frame of the video stream may be brought to the same coordinate system of the document for further processing. To do this, the method of finding the boundaries (corners) of the document is used, after which projective correction of the document image to a fixed size N×M is performed. The fixed size has the corresponding aspect ratio of the document from which the document image is taken.

Algorithms based on the correspondence of the key points of the document image and the template may be used. In addition to the corners of the document and the required projective transformation, this class of algorithms is able to return a pseudo-probabilistic estimate of confidence in the output. In order to improve the accuracy of the final method for subsequent processing, frames with the result of finding boundaries that have confidence not lower than an experimentally chosen threshold are taken. Otherwise, the frame is rejected.

Color Saturation and Hue Maps Construction

Analysis of color characteristics in the document image areas is made after the calculation of saturation, and hue maps are calculated independently for each pixel (R G, B) of the original document image. It is assumed that R, G, B components are within [0, 255].

For the effective calculation of the saturation S, the following formula is used:

$$S=S(R,G,B)=\max(R,G,B)-\min(R,G,B).$$

Let M=max (R, G, B). Then, the hue indicator H is calculated as follows:

$$H' = H'(R, G, B) = \begin{cases} 0, & S = 0 \\ (G-B)/6S + 0/3, & M = R \\ (B-R)/6S + 1/3, & M = G \\ (R-G)/6S + 2/3, & M = B \end{cases}$$

$$H = H(R, G, B) = 255 \cdot H'(R, G, B) \pmod{256}.$$

In order to increase performance, the color tone invariance property is used under adding the same value d to the components R, G, B:

$$H(R,G,B)=H(R+d,G+d,B+d)$$

Thus, there are only $4 \cdot 256^2$ different output values H(R, G, B), which permit building the pre-calculated table of color tone values.

For a stable observation of the variability of color characteristics in document image areas, instead of comparing individual pixels in the coordinate system of the document, a window is analyzed around the pixel position, which increases the robustness of the method to camera noise and errors in finding the document image boundaries.

Figure 2:
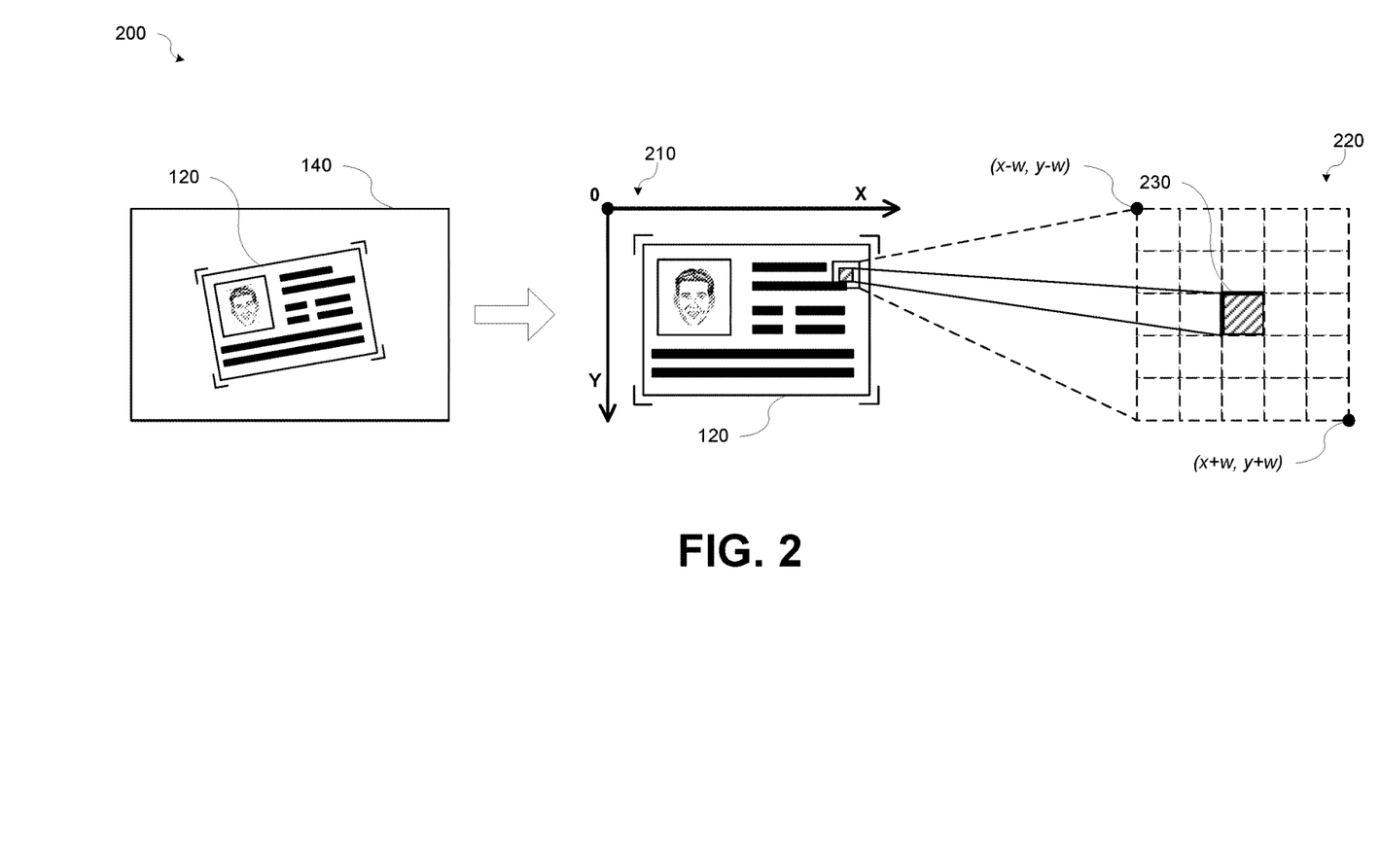
FIG. 2 is a diagram illustrating construction of a window according to various embodiments.
Figure 3:
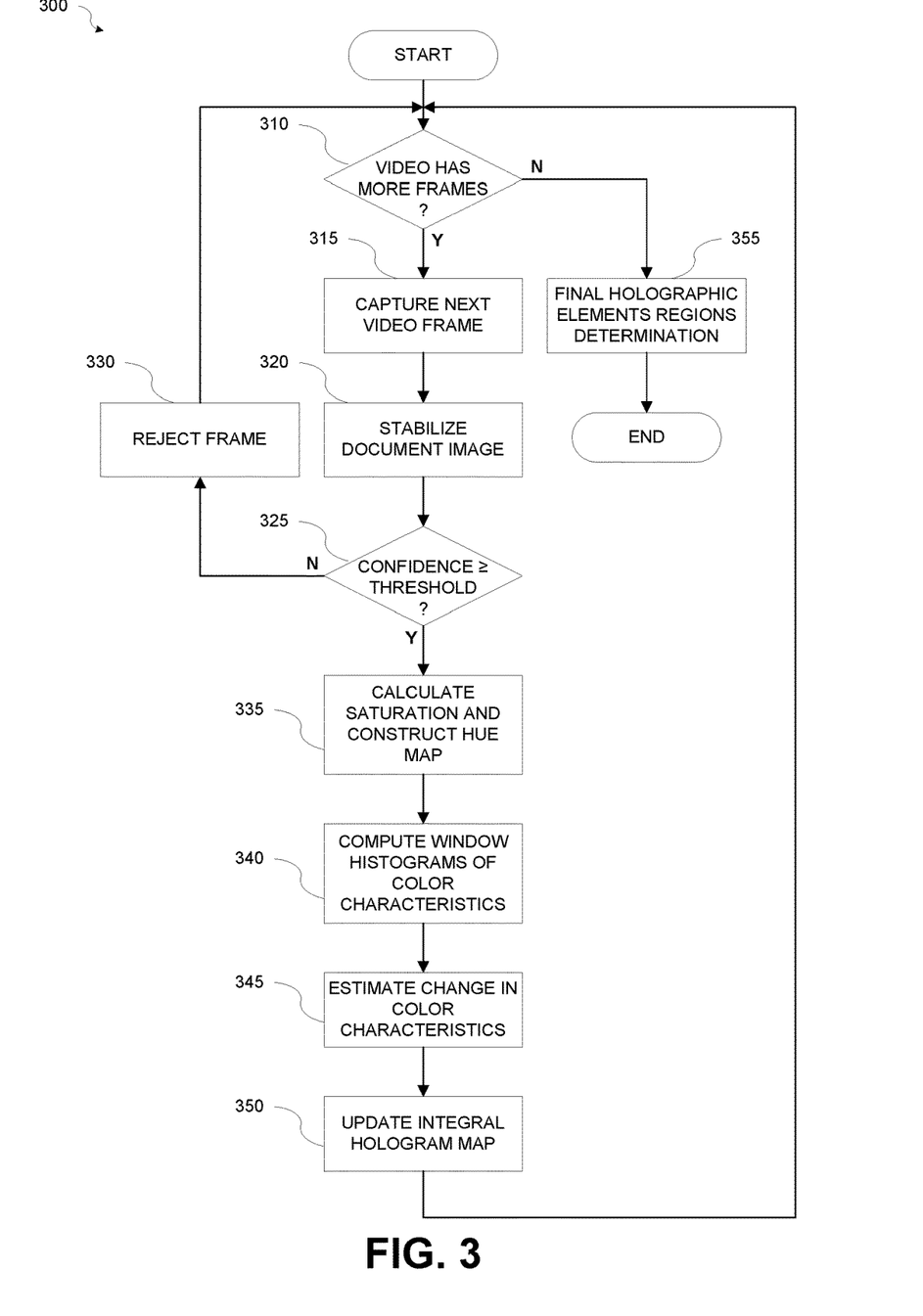
FIG. 3 is a flowchart illustrating a method for detection and localization of holograms present on documents which are extracted during video stream recognition in accordance with various aspects of the present disclosure.

FIG. 2 is a diagram illustrating construction of a window 220 in accordance with various aspects of the present disclosure. Referring to FIG. 3, a randomly aligned document image 120 in the RGB color space 140 may be stabilized to a fixed size in a coordinate system 210. A window $W_{x,y}$ 220 with wing w around each pixel 230 at position (x, y) of the frame of the video stream may be constructed, obtaining images of region (x−w, y−w) to (x+w, y+w) and area $(2w+1)^2$.

A weighted color characteristics histogram $C_{x,y}$ may be associated with each window $W_{x,y}$ in which the intervals (bins) are the values of the hue and the partitioning is made to U intervals:

$$C_{x,y}=(C_{x,y}^0, \ldots, C_{x,y}^{U-1})$$

Consider the pixel (x, y) belonging to the window $W_{x,y}$ with the components (R, G, B). Its interval index u in the histogram is defined as:

$$u = u(R, G, B) = \left\lfloor \frac{H(R, G, B) * U}{256} \right\rfloor$$

When glare hits the region of the document image, the histogram can be subject to unwanted distortions. A property of the effect of the glare on the document image region is the reduction in the saturation values in the region. For this reason, a weight is put of the pixel (R, G, B) at the (x, y) inside the window $W_{x,y}$, equal to its saturation when accounting for the glare in the histogram:

$$C_{x,y}^u = \sum_{\substack{(x,y) \in W_{x,y} \\ u(x,y)=u(R,G,B)=u}} S(R, G, B)$$

Since the hue is an angular value (in this case, modulo 256), it is desirable to select B dividing 256, so that each interval of the histogram has an equal number of initial values without additional processing of edge cases.

It should be noted that calculation of all window histograms in a naive way for an algorithm whose complexity increases in proportion to the projective correction of the image and the two-dimensional window around a pixel (i.e., O ($NMW^2$)) is extremely inefficient, so it is important to implement O ($NMW^2$) by sliding the window and recalculating the histogram only at the borders.

Estimation of Change in Color Characteristics

Consider two adjacent frames $I_{k-1}$ and $I_k$ and their histograms of the window color characteristics $C_{k-1}$ and $C_k$. Evaluation of the presence of holograms in a fixed window with center (x, y) is performed independently of other windows based on histograms $C_{x,y}^k$ and $C_{x,y}^{k-1}$.

In order to assess the change in color characteristics, a difference between the histograms on the current and previous frame, for example, but not limited to, the standard deviation, may be calculated. However, for its calculation, the histograms may be normalized to the same sum of weights, and consideration for weights may be included in order to avoid false positive estimates in the areas of glare.

Denoting as $|C_{x,y}^k|$ the sum of weights in the window histogram:

$$|C_{x,y}^k| = \sum_{u=0}^{U-1} C_{x,y}^{k,u}$$

Let us assume that $|C_{x,y}^{k-1}| \leq |C_{x,y}^k|$, otherwise swap them. A correct estimate of the variability of color characteristics should be small for a small sum of saturation of one of the histograms, which indicates the presence of a glare. We normalize to a histogram having a smaller total weight:

$$|C_{x,y}^k| := \frac{|C_{x,y}^{k-1}|}{|C_{x,y}^k|} \cdot \sum_{u=0}^{U-1} C_{x,y}^{k,u}$$

The final estimate of $P_{x,y}^k$ of the presence of the hologram in the window (x, y) for the $I_k$ frame (based on its difference with the $I_{k-1}$ frame) is the standard deviation of the histograms normalized in following way:

$$P_{x,y}^k = \frac{1}{U} \sum_{u=0}^{U-1} (C_{x,y}^{k,u} - C_{x,y}^{k-1,u})^2$$

Integral Hologram Presence Map Computation

Estimations $P^k$ computed for individual frames may be combined into an integral hologram presence map Q. Integral map $Q_k$ for frames 1 . . . k is computed by weighting estimations $P^k$ with document stabilization confidence levels $c_k$ on corresponding k-th frame:

$$Q_{x,y}^k = \frac{Q_{x,y}^{k-1} \sum_{i=1}^{k-1} c_i + P_{x,y}^k c_k}{\sum_{i=1}^{k} c_i}$$

In the end of processing all K frames of a video stream, the final integral map Q is therefore equal to $Q_K$.

Final Holographic Elements Regions Determination

A gamma correction of the integral map of the estimates Q may be performed to strengthen the regions of maxima, and its binarization by the Otsu method may be performed to obtain a binary map of the presence of the holograms Q*. One of ordinary skill in the art will appreciate that other binarization methods may be used without departing from the scope of the present disclosure.

The determination of the area of the holographic element is performed by finding the connected components on the binary map Q*. For the found connected component with the largest area (one or several), a bounding rectangle may be constructed, which is the final value in the document coordinate system returned by the algorithm.

Restoration of the bordering quadrangles of the detected holograms for the original frames of the video stream can be realized with the help of inverse projective transformations of the found final rectangle—both during the transition from the document's coordinate system to the original frame, and between frames.

FIG. 3 is a flowchart illustrating a method for detection and localization of holograms present on documents which are extracted during video stream recognition in accordance with various aspects of the present disclosure. Referring to FIG. 3, at block 310, it may be determined whether the video stream has more frames. For example, the control unit may determine whether an end of the video stream has been reached.

In response to determining that there are no more frames in the video stream (310-N), at block 355 the control unit may perform a final holographic elements region determination. For example, a gamma correction of the integral map of the estimates Q may be performed and its binarization may be performed to obtain a binary map of the presence of the holograms Q*. The area of the holographic element may be determined by finding the connected components on the binary map Q*, and a bounding rectangle may be constructed for the found connected component with the largest area (one or several).

In response to determining that there are more frames in the video stream (310-Y), at block 315 a next video frame may be capture. At block 320, a document image may be stabilized. For example, the video frame may be brought to the same coordinate system of the document by finding the boundaries (e.g., corners) of the document, after which projective correction of the document image to a fixed size N×M may be performed. The fixed size of the document image has the corresponding aspect ratio of the document from which the document image is taken.

At block 325, it may be determined whether a document stabilization confidence estimate is equal to or greater than a threshold value. For example, the control unit may determine a pseudo-probabilistic estimate of confidence in the document stabilization process and may compare the confidence estimate to a threshold value. The threshold value may be predetermined. In response to determining that the confidence estimate is not equal to or greater than a threshold value (325-N), at block 330 the control unit may reject the frame and the method may continue at block 310.

In response to determining that the confidence estimate is equal to or greater than a threshold value (325-Y), at block 335 saturation may be calculated and a hue map may be constructed. For example, the control unit may calculate saturation as a difference of maximum and minimum color values of an original document image and analyze color characteristics in the document image areas after the construction of saturation to construct hue maps independently for each pixel (R, G, B) of the original document image.

At block 340, window histograms of color characteristics may be calculated. For example, referring to FIG. 2, the control unit may construct a window $W_{x,y}$ 220 with wing w around each pixel 230 at position (x, y) of the frame. A weighted color characteristics histogram $C_{x,y}$ may be associated with each window $W_{x,y}$, in which the intervals (bins) are the values of the hue. It should be noted that when glare hits the region of the document image, the histogram can be subject to unwanted distortions. Therefore, a weight may be put of the pixel (R, G, B) at the (x, y) inside the window $W_{x,y}$ equal to its saturation when accounting for the glare in the histogram.

At block 345, a change in color characteristics may be estimated. For example, the control unit may calculate a difference between the histograms on the current and previous frame, and the histograms may be normalized to the same sum of weights, and consideration for weights may be included in order to avoid false positive estimates in the areas of glare. The calculation may be, for example, but not limited to, the standard deviation.

At block 350, an integral hologram map may be updated. For example, the control unit may combine estimates computed for individual frames into an integral hologram presence map. After the integral hologram map is updated, the process may continue at block 310.

Figure 4:
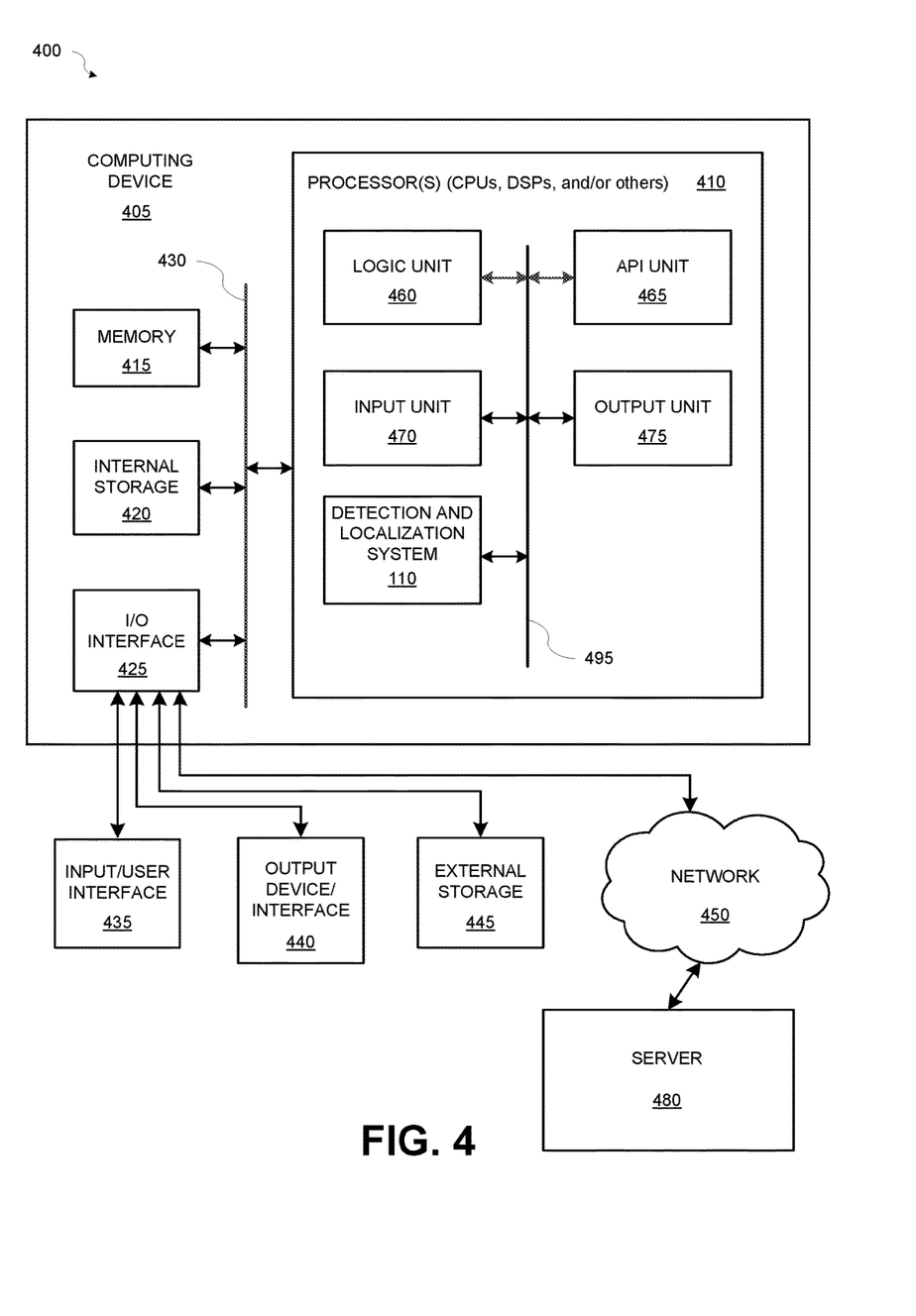
FIG. 4 is a block diagram illustrating an example computing environment with an example computing device associated with the system and method for detection and localization of holograms in accordance with various aspects of the present disclosure.

FIG. 4 is a block diagram illustrating an example computing environment 400 with an example computing device 405 associated with the system and method for detection and localization of holograms present on documents which are extracted during video stream recognition in accordance with various aspects of the present disclosure. The computing environment 400 may include a computing device 405 and a server 480. The server 480 may communicate with the computing device 405 via a network 450.

The computing device 405 may be, for example, a user device. The computing device 405 may include one or more processing units, cores, or processors 410, memory 415 (e.g., RAM, ROM, and/or the like), internal storage 420 (e.g., magnetic, optical, solid state storage, and/or organic), and/or I/O interface 425, any of which can be coupled on a communication mechanism or bus 430 for communicating information or embedded in the computing device 405. The memory 415 and/or the internal storage 420 may be configured to store operating systems and/or application programs for operation of the computing device 405 that are executed by the one or more processing units, cores, or processors 410, as well as to store application data and user data.

The computing device 405 may be communicatively coupled to an input/user interface 435 and an output device/interface 440. Either one or both of the input/user interface 435 and the output device/interface 440 may be a wired or wireless interface and can be detachable. The input/user interface 435 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). The output device/interface 440 may include a display, television, monitor, printer, speaker, braille, or the like. In some example implementations, the input/user interface 435 and the output device/interface 440 may be embedded with or physically coupled to the computing device 405. In other example implementations, other computing devices may function as or provide the functions of the input/user interface 435 and the output device/interface 440 for the computing device 405.

Examples of the computing device 405 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

The computing device 405 can be communicatively coupled (e.g., via the I/O interface 425) to external storage 445 and a network 450 for communicating with any number of networked components, devices, and systems, including one or more computing devices of the same or different configuration. The computing device 405 or any connected computing device can be functioning as, providing services of, or referred to as a server, client, thin server, general machine, special-purpose machine, or another label.

The I/O interface 425 may include wireless communication components (not shown) that facilitate wireless communication over a voice and/or over a data network. The wireless communication components may include an antenna system with one or more antennae, a radio system, a baseband system, or any combination thereof. Radio frequency (RF) signals may be transmitted and received over the air by the antenna system under the management of the radio system.

The I/O interface 425 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in the computing environment 400. The network 450 can be any network or combination of networks (e.g., the Internet, local area network, wide area network, a telephonic network, a cellular network, satellite network, and the like).

The computing device 405 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

The computing device 405 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

The processor(s) 410 can execute under any operating system (OS) (not shown), in a native or virtual environment. One or more applications may be deployed that may include a logic unit 460, an application programming interface (API) unit 465, an input unit 470, an output unit 475, and the detection and localization system 110. For example, the detection and localization system 110 may execute one or more processes shown in FIG. 3. The described units and elements can be varied in design, function, configuration, or implementation and are not limited to the descriptions provided.

In some example implementations, when information or an execution instruction is received by API unit 465, it may be communicated to one or more other units (e.g., the logic unit 460, the input unit 470, the output unit 475, the application delivery system 110, and the detection and localization system 110).

For example, after input unit 470 has received input from a user, such as an instruction to launch or quit an application or other such user interaction, input unit 470 may use API unit 465 to communicate an event notification to the detection and localization system 110.

In some instances, logic unit 460 may be configured to control the information flow among the units and direct the services provided by the API unit 465, the input unit 470, the output unit 475, and the detection and localization system 110. For example, the flow of one or more processes or implementations may be controlled by logic unit 460 alone or in conjunction with API unit 465.

The method 300 may be embodied on a non-transitory computer readable medium, for example, but not limited to, the memory 415, the internal storage 420, or other non-transitory computer readable medium known to those of skill in the art, having stored therein a program including computer executable instructions for making a processor, computer, or other programmable device execute the operations of the methods.

The example implementations may have various benefits and advantages. For example, but not by way of limitation, enhanced tracking of the fact of application usage to enable more equitable resource sharing among developers of software managed by the application delivery.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The accompanying claims and their equivalents are intended to cover such forms or modifications as would fall within the scope and spirit of the protection. For example, the example apparatuses, methods, and systems disclosed herein can be applied to detecting and recognizing holograms in a video stream consisting of a series of images. Also, the features and attributes of the specific example embodiments disclosed above may be combined in different ways to form additional embodiments, all of which fall within the scope of the present disclosure.

The foregoing method descriptions are provided merely as illustrative examples and are not intended to require or imply that the operations of the various examples must be performed in the order presented. As will be appreciated by one of skill in the art the order of operations in the foregoing examples may be performed in any order. Words such as "thereafter," "then," "next," etc., are not intended to limit the order of the operations; these words are simply used to guide the reader through the description of the methods. Further, any reference to claim elements in the singular, for example, using the articles "a," "an," or "the" is not to be construed as limiting the element to the singular.

Skilled artisans may implement the described functionality in varying ways for each particular application, but such implementation decisions should not be interpreted as causing a departure from the scope of the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain examples and applications, other examples that are apparent to those of ordinary skill in the art, including examples which do not provide all of the features and advantages set forth herein, are also within the scope of this disclosure. Accordingly, the scope of the present disclosure is intended to be defined only by reference to the appended claims.

What is claimed is:

1. A method for detecting holographic elements in a video stream containing document images, the method comprising:
    processing of a video stream in which at least one document image is stabilized;
    constructing saturation and color tone maps;
    analyzing color characteristics in at least one document image region;
    constructing histograms of color characteristics;
    estimating a change in the color characteristics at least in part based on data obtained by calculating a difference between the histograms of a current and a previous frame;
    constructing an integrated map of hologram presence estimates by combining calculated estimates for all video stream frames based at least in part on the estimation of the change in color characteristics; and
    determining final regions of the holographic elements based at least in part on the integrated map of the hologram presence estimates.

2. The method of claim 1, wherein the least one document image is stabilized by bringing each frame of the video stream to a single coordinate system of the least one document image for which boundaries are determined, and
    projectively correcting the least one document image to a fixed size having an aspect ratio corresponding to a document from which the document image is taken.

3. The method of claim 1, wherein the histograms of the color characteristics in a document image area are constructed by analyzing a window around a pixel position based on coordinates of the at least one document image region and the document image area.

4. The method of claim 1, wherein estimates calculated for individual frames are combined for all frames of the video stream to obtain the integrated map of hologram presence estimates.

5. The method of claim 1, further comprising:
    performing gamma correction of the integrated map of hologram presence estimates to amplify maxima regions;
    performing binarization to obtain a binary map of hologram presence;
    finding connected components on the binary map; and
    constructing a bounding rectangle for the connected components forming a largest area to determine a final holographic element region.

6. A non-transitory computer readable medium having stored therein a program for making a computer execute a method for detecting holographic elements in a video stream containing document images, said program including computer executable instructions for performing operations comprising:
    processing of a video stream in which at least one document image is stabilized;
    constructing saturation and color tone maps;
    analyzing color characteristics in at least one document image region;
    constructing histograms of color characteristics;
    estimating a change in the color characteristics at least in part based on data obtained by calculating a difference between the histograms of a current and a previous frame;
    constructing an integrated map of hologram presence estimates by combining calculated estimates for all video stream frames based at least in part on the estimation of the change in color characteristics; and
    determining final regions of the holographic elements based at least in part on the integrated map of the hologram presence estimates.

7. The non-transitory computer readable medium having stored therein a program as defined in claim 6, the program further comprising instructions to perform operations comprising:
    stabilizing the at least one document image by bringing each frame of the video stream to a single coordinate system of the at least one document image for which boundaries are determined; and
    projectively correcting the at least one document image to a fixed size having an aspect ratio corresponding to a document from which the document image is taken.

8. The non-transitory computer readable medium having stored therein a program as defined in claim 6, the program further comprising instructions to perform operations comprising:
    constructing the histograms of the color characteristics in a document image area by analyzing a window around a pixel position based on coordinates of the at least one document image region and the document image area.

9. The non-transitory computer readable medium having stored therein a program as defined in claim 6, the program further comprising instructions to perform operations comprising:
    combining estimates calculated for individual frames for all frames of the video stream to obtain the integrated map of hologram presence estimates.

10. The non-transitory computer readable medium having stored therein a program as defined in claim 6, the program further comprising instructions to perform operations comprising:
    performing gamma correction of the integrated map of hologram presence estimates to amplify maxima regions;
    performing binarization to obtain a binary map of hologram presence;
    finding connected components on the binary map; and
    constructing a bounding rectangle for the connected components forming a largest area to determine a final holographic element region.

11. A system for detection and localization of holographic elements in a video stream containing document images, the system comprising:
    an I/O interface configured to receive a video stream; and
    a processor configured to:
        process the video stream in which at least one document image is stabilized;
        construct saturation and color tone maps;
        analyze color characteristics in at least one document image region;
        construct histograms of the color characteristics;

estimate a change in the color characteristics at least in part based on data obtained by calculating a difference between the histograms of a current and a previous frame;

construct an integrated map of hologram presence estimates by combining calculated estimates for all frames of the video stream based at least in part on the estimation of the change in color characteristics; and determine final regions of the holographic elements based at least in part on the integrated map of the hologram presence estimates.

12. The system of claim 11, wherein the processor is further configured to:

stabilize the at least one document image by bringing each frame of the video stream to a single coordinate system of the at least one document image for which boundaries are determined; and projectively correct the at least one document image to a fixed size having an aspect ratio corresponding to a document from which the at least one document image is taken.

13. The system of claim 11, wherein the processor is further configured to:

construct the histograms of the color characteristics in a document image area by analyzing a window around a pixel position based on coordinates of the at least one document image region and the document image area.

14. The system of claim 11, wherein the processor is further configured to:

combine estimates calculated for individual frames for all frames of the video stream to obtain the integrated map of hologram presence estimates.

15. The system of claim 11, wherein the processor is further configured to:

perform gamma correction of the integrated map of hologram presence estimates to amplify maxima regions;

perform binarization to obtain a binary map of hologram presence;

find connected components on the binary map; and construct a bounding rectangle for the connected components forming a largest area to determine a final holographic element region.

* * * * *